United States Patent
Bell et al.

(10) Patent No.: US 12,204,434 B2
(45) Date of Patent: Jan. 21, 2025

(54) BUILD SYSTEM SUPPORTING CODE AUDITS, CODE VERIFICATION, AND SOFTWARE FORENSICS

(71) Applicant: Karma Automotive LLC, Irvine, CA (US)

(72) Inventors: Jack William Bell, Darrington, WA (US); Dana Richard Powell, Manotick (CA)

(73) Assignee: Karma Automotive LLC, Irvine, CA (US)

( * ) Notice: Subject to any disclaimer, the term of this patent is extended or adjusted under 35 U.S.C. 154(b) by 80 days.

(21) Appl. No.: 17/881,456

(22) Filed: Aug. 4, 2022

(65) Prior Publication Data

US 2024/0045786 A1    Feb. 8, 2024

(51) Int. Cl.
   *G06F 8/41*    (2018.01)
   *G06F 11/36*   (2006.01)

(52) U.S. Cl.
   CPC .......... *G06F 11/3608* (2013.01); *G06F 8/433* (2013.01); *G06F 11/3696* (2013.01)

(58) Field of Classification Search
   CPC ..................................... G06F 8/433
   USPC ........................................ 717/126
   See application file for complete search history.

(56) References Cited

U.S. PATENT DOCUMENTS

| | | | | |
|---|---|---|---|---|
| 8,776,014 B2 * | 7/2014 | Arnott | ....................... | G06F 8/71 717/110 |
| 10,535,349 B2 | 1/2020 | Saxena et al. | | |
| 10,656,927 B2 * | 5/2020 | Hawrylo | ................... | G06F 8/60 |
| 10,671,384 B1 * | 6/2020 | Boynes | ............... | G06F 9/44526 |
| 11,163,544 B2 * | 11/2021 | Lee | ....................... | G06F 9/5061 |
| 11,281,571 B2 * | 3/2022 | Ramachandran | ... | G06F 11/3608 |
| 11,301,217 B1 * | 4/2022 | Gezen | ....................... | G06F 8/63 |
| 11,328,065 B1 * | 5/2022 | Wall | ....................... | G06F 21/51 |

(Continued)

FOREIGN PATENT DOCUMENTS

EP    2932374 B1 * 11/2023    ............... G06F 8/65

OTHER PUBLICATIONS

Lukas Bretz et al. "A concept for managing information in early stages of product engineering by integrating MBSE and workflow management systems"; Fraunhofer Research Institution for Mechatronic System Design IEM 33102 Paderborn, Germany.*

(Continued)

*Primary Examiner* — Francisco J Aponte
(74) *Attorney, Agent, or Firm* — Honigman LLP; Grant Griffith; Thomas J. Appledorn

(57) ABSTRACT

In various embodiments, and apparatus may be configured to identify a software blueprint for creating a reproducible software build, wherein the software blueprint contains resource nodes that contain a manifest of named build steps and 1) a resource identifier, or 2) a single source of truth (SSOT) resource software locator; generate modeling information identifying a hierarchically controlled order or a topographically sorted order for the build steps; populate a project hierarchy based on the modeling information, wherein the project hierarchy comprises an SSOT for the reproducible software build; assemble the reproducible software build using the SSOT, including processing the build steps in the hierarchically controlled order or the topographically sorted order for the build steps. Other embodiments may be disclosed and/or claimed.

15 Claims, 6 Drawing Sheets

(56) References Cited

U.S. PATENT DOCUMENTS

| | | | | |
|---|---|---|---|---|
| 11,385,867 | B1* | 7/2022 | Kirilov | G06F 8/34 |
| 11,531,530 | B1* | 12/2022 | Henry | G06F 8/63 |
| 11,924,284 | B1* | 3/2024 | Hanson | H04L 67/133 |
| 2014/0282450 | A1* | 9/2014 | Jubran | G06F 8/71 717/151 |
| 2016/0378449 | A1* | 12/2016 | Khazanchi | G06F 9/5077 717/120 |
| 2017/0235559 | A1* | 8/2017 | Saenz | G06F 11/3672 717/171 |
| 2017/0357485 | A1* | 12/2017 | Rees | G06F 8/71 |
| 2018/0165080 | A1* | 6/2018 | Dimitrov | G06F 8/60 |
| 2018/0267780 | A1* | 9/2018 | Richards | G06F 8/71 |
| 2018/0329693 | A1* | 11/2018 | Eksten | G06F 8/65 |
| 2018/0336121 | A1* | 11/2018 | Alladi | G06F 11/3672 |
| 2020/0319879 | A1* | 10/2020 | Ghosh | G06F 8/77 |
| 2020/0401386 | A1* | 12/2020 | Punathil | G06F 8/433 |
| 2021/0126949 | A1* | 4/2021 | Nadgowda | H04L 63/1433 |
| 2021/0157551 | A1* | 5/2021 | Bliss | G06N 20/00 |
| 2022/0222069 | A1* | 7/2022 | Ravindranath | G06F 8/73 |
| 2022/0222351 | A1* | 7/2022 | Levin | G06F 8/71 |
| 2022/0284399 | A1* | 9/2022 | Rohatgi | G06Q 50/08 |
| 2023/0008839 | A1* | 1/2023 | Henry | G06F 8/61 |
| 2023/0045235 | A1* | 2/2023 | Pierscieniak | G06F 8/65 |
| 2023/0053820 | A1* | 2/2023 | Pokorny | G06F 8/61 |
| 2023/0126059 | A1* | 4/2023 | Stumm | G06F 8/10 717/101 |
| 2023/0325179 | A1* | 10/2023 | Griffin | G06F 11/3409 717/120 |
| 2023/0409346 | A1* | 12/2023 | Nguyen | H04L 41/0803 |
| 2024/0168730 | A1* | 5/2024 | Cherivirala | G06F 8/10 |

OTHER PUBLICATIONS

Esa Paavola "Managing Multiple Applications on Kubernetes Using GitOps Principles"; Metropolia University of Applied Sciences Bachelor of Engineering Information and Communication Technology Bachelor's Thesis—Aug. 30, 2021.*

Athalye, Anish, et al.; Package Manager Security; 2014; Retrieved from the internet at https://css.csail.mit.edu/6.858/2014/projects/aathalye-rhristov-viettran-qui.pdf, 5 pages.

Gerste, Paul; Securing Developer Tools: Package Managers; Mar. 8, 2022; Retrieved from the internet at https://blog.sonarsource.com/securing-developer-tools-package-managers/; 7 pages.

Wikipedia; Dependency hell; accessed on Dec. 14, 2021 at https://en.wikipedia.org/wiki/Dependency_hell; 7 pages.

Wikipedia; Forensic software engineering; accessed on Dec. 14, 2021 at https://en.wikipedia.org/wiki/Forensic_software_engineering; 1 page.

Wikipedia; MapReduce; accessed on Dec. 14, 2021 at https://en.wikipedia.org/wiki/MapReduce; 13 pages.

Wikipedia; npm (software); accessed on Dec. 14, 2021 at https://en.wikipedia.org/wiki/Npm_(software)#Notable_breakages; 5 pages.

Wikipedia; Package manager; accessed on Dec. 14, 2021 at https://en.wikipedia.org/wiki/Package_manager; 10 pages.

Wikipedia: Pipeline (computing); accessed on Dec. 14, 2021 at https://en.wikipedia.org/wiki/Pipeline_(computing); 5 pages.

Wikipedia; Single source of truth; accessed on Dec. 14, 2021 at https://en.wikipedia.org/wiki/Single_source_of_truth; 5 pages.

Wikipedia; Software audit review; accessed on Dec. 14, 2021 at https://en.wikipedia.org/wiki/Software_audit_review; 3 pages.

Wikipedia; Software verification; accessed on Dec. 14, 2021 at https://en.wikipedia.org/wiki/Software_verification; 3 pages.

* cited by examiner

BUILD SYSTEM SUPPORTING CODE AUDITS, CODE VERIFICATION, AND SOFTWARE FORENSICS

COPYRIGHT NOTICE

© 2022 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

Embodiments of the present disclosure relate to the field of continuous data processing, and in particular, to methods and apparatuses associated with code audits, code verification, and software forensics.

BACKGROUND

When software code is created for a large customer base engaging in a potentially hazardous activity or for any other situation where that code could conceivably create heightened liability, such as automotive or medical use cases, it is necessary to audit and verify the code before rollout in ways that go beyond normal software testing. A code audit may involve assuring software source code quality via an independent review of the source code and development practices (https://en.wikipedia.org/wiki/Software_audit_review). A code verification may involve assuring software runtime quality by measuring the application against the expected requirements, including both static and dynamic verification (https://en.wikipedia.org/wiki/Software_verification).

Moreover, if something does go wrong during testing or after the rollout the software must undergo forensic analysis to determine precisely what happened, why it happened, and how the software defect found its way into the code in order to determine culpability and avoid the same problem in the future. Software forensics may include analyzing and reconstructing software applications to determine, after the fact, the source of a problem (https://en.wikipedia.org/wiki/Forensic_software_engineering).

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

Some known software build tooling and package managers/configuration management systems may not produce repeatable builds, which may make code audits, code verification, or software forensics difficult or impossible. Various embodiments of a build system supporting code audits, code verification, and software forensics may provide controlled and reproducible software builds from source code (in which compilers and other build tools are able to create the same binary object code from the same source).

Any build system described herein may support externally defined device-specific build rules and steps and dependencies to use when compiling portable software modules for those devices. In other words, code verification by or through associating particular dependencies, build rules, and steps with a particular device.

In any build system described herein, where portable code is possible, the build system may allow software modules to be built for any physical device by utilizing the default dependencies, build rules, and steps for that particular device. Where portability is not possible, the build system may allow the software modules themselves to declare what devices on which they can run and to specify dependencies, build rules, and steps for that particular device with module-specific dependencies, build rules, and steps. This may take the form of specifying build rules and steps in addition to or in replacement of the default build rules and steps for a particular target device.

Any build system described herein may, by validating the generated modeling information, enforce a requirement for all software components to be 'versioned' using the capabilities of a trusted software repository system. This allows a way to specify a particular and immutable version of each input used for the software build.

Any build system described herein may also disallow or restrict the use of software dependency and configuration management systems. Where there are dependencies, the build system may enforce a requirement that they are authenticated by the appropriate software modules or hardware descriptions and retrieved as source from the trusted software repository system. This may apply specifically to 'uncontrolled' software dependency and configuration management systems which bring in code from external locations not under the control or vetting of the organization— there are many examples of such systems with limited 'reach' where the code repositories are managed by the organization or trusted partners.

A build system controller may provide a software blueprint (e.g., a description of the association of components and datatype resources, which contain build steps that are used in the build process) for a package of applications defining what software components and data types are used to build each application, the configuration parameters of the software components and data types, and the relationships between the modules and date types.

Software blueprint packages may encapsulate one or more target specific application. Applications may have a runtime resource and set of module and data type resources that makeup the applications. Where applicable these resources may be defined in system resource collections that define the relationships and structure of the build and runtime components.

Starting from the application instructions (e.g., a software blueprint), the build system may generate modeling information which may define a relationship graph including nodes for all component resources that describe the packaging, runtime environments, software modules, and datatypes used to create one or more device specific applications and/or one or more device-specific operating system (OS) packages or other artifacts. These nodes may include version and software location information of the 'Single Source of Truth' (SS OT) repositories, build-time and run-time configuration parameters, capability information, and named build steps applicable to packaging, and device specific applications. The edges between nodes may describe the relationship between the resource nodes including but not limited to build and step dependencies and control data flow.

A software component may be described within a metadata file that is collocated with its sources. Runtime configuration parameter schemas, build time configuration parameter schemas, and named steps may be contained in the metadata files for each component required to build an application and extracted when creating a software blueprint. A user may refine the draft software blueprint used by the build systems to build device, runtime, and application specific code by editing the draft software blueprint before the software blueprint is approved. This may include editing:

1. Runtime configuration(s) used to affect the software that will run on a device that uses the component sources within an application;
2. Build time configuration(s) used in the configuration of a component's build time sources to affect application and library builds; and/or
3. Named steps for a component to affect the creation of any component or the application. Extracted named steps may be modified or deleted and new named steps may be added to the component references.

The generated modeling information may track and verify versions for all software components—meaning the modeling information must be validated for internal consistency. This may ensure all components listed in the modeling information are immutable and specify precisely which version of the source code in the trusted software repository is used to build them.

The build system may execute the application build by utilizing build steps associated with component resources contained within the software blueprint. The build system may construct the application from source code using different rules for testing, verification, or deployment. For each software component and its dependencies, the build system may retrieve all source code from a trusted software repository system based on the declared versions of the components in the generated modeling information. For each software component, the build system may first run any automated tests supplied with each software component—verifying that component before it is used in the build. The build system may process all defined build steps. The build system may create and stores logs of each step for auditing and software forensic purposes.

Any build system described herein may enable entirely replicable builds (replicable within the limits of the build tools, which may not emit exactly the same binary object code from the same inputs) because all inputs, including source code, dependencies, build rules and steps, and the packages themselves, are versioned and the versions are immutable. The build system may enforce a requirement that all software components, software dependencies, and device declarations are 'versioned' using the capabilities of a trusted software repository system-allowing for a way to specify a particular and immutable version of each input used for the software build.

Any build system described herein may not only build directly for devices, but may also support building for emulators and simulators for testing and verification purposes using build rules and steps specific to the devices or components (if device-specific or component-specific build rules and steps are required in those cases). These build rules and steps for emulators or simulators may be tracked with the device or component along with the device hardware target build rules and steps. Device-specific or component-specific test rules may be applied to software component automated tests, which may run separately from the main build.

Additional aspects and advantages of this invention will be apparent from the following detailed description of preferred embodiments, which proceeds with reference to the accompanying drawings.

DETAILED DESCRIPTION

Figure 1A:
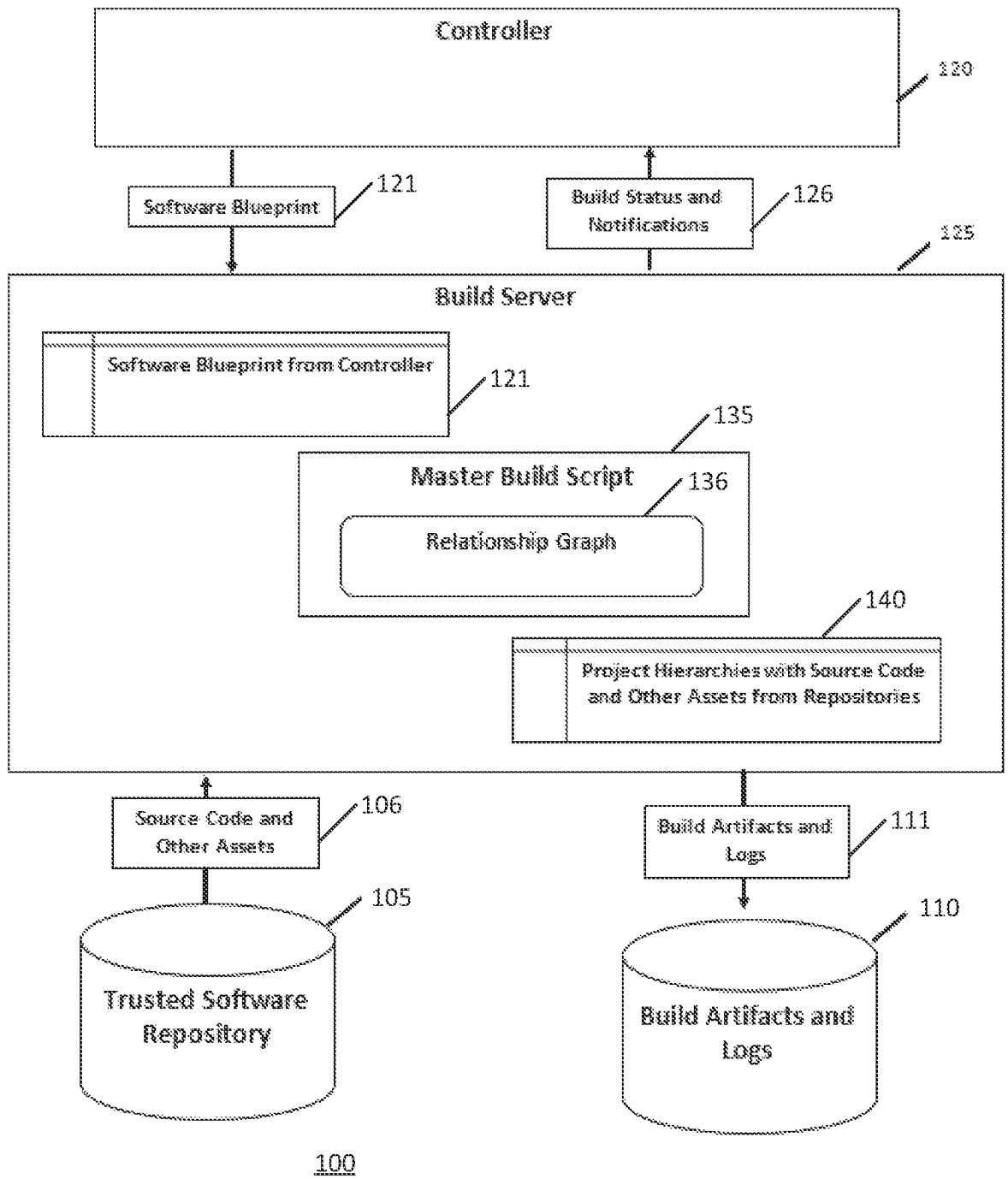
FIG. 1A schematically illustrates a build system supporting code audits, code verification, and software forensics, according to various embodiments.

The usual way to ensure quality in critical software deployments is to perform final builds of the software code on specially prepared build systems operated by trained personnel, with backups made of the code to be built and some manual record keeping. Modern software versioning repositories, such as Git, assist with this process by allowing a particular version of the source code to be 'tagged' such that an exact version of software code and build rules can always be retrieved later.

Modern software development typically requires various software libraries and code modules from external sources, e.g., software dependencies. These dependencies may represent a significant portion of the compiled application and may not be under the control of the code developing organization. Moreover, dependencies often have dependencies and those have their own downstream dependencies, e.g., nested dependencies. As a result software developers colloquially reference to the management of these dependencies as 'Dependency hell' (https://en.wikipedia.org/wiki/Dependency_hell)

As a result many software application builds require 'Package Managers' or configuration management systems, which automate the process of managing those dependencies; often pulling the external code as needed from various locations on the Internet (https://en.wikipedia.org/wiki/Package_manager). This means a prudently controlled and managed software application build might include source code and pre-compiled code fetched from a variety of origins of unknown provenance at build time. This represents more potential vectors for problems and reduces the ability to effectively perform code audits and verification. The automation of dependency or configuration management may break the reliability/credibility of this modeling. And this represents another problem for code audits, code verification, and software forensics: if code is pulled in at compile time from servers the organization does not control (e.g., without using dependency maps that the organization created), the package manager may be a vector for accidently picking up broken code or even malware inserted by bad actors.

As a result performing code audits and verification on software builds using package managers is extremely complicated and software forensics might not be possible if any source code used for the original build is no longer available for some reason.

These problems cannot be entirely solved with existing software build tooling and package managers/configuration management systems. And, as a result, one of the best ways to ensure repeatable (and auditable) builds is to not use a package manager at all, despite the other benefits they provide. However, doing so requires individuals to perform the same tasks manually; possibly introducing errors and making mistakes. The design goal of building similar software applications for a variety of hardware and OS targets at the same time brings additional challenges, however. Retreating to a fully or partially manual software build system can work in any many instances, but when dealing with immensely complex software deployments of related code across multiple hardware platforms, each using different toolchains, the manual modeling breaks down as well. Some automation of the process is needed to execute these builds in any kind of reasonable and repeatable way.

Consider one specific example of targeting multiple hardware and OS targets at the same time—three targeted devices for deployment of similar or at least related software applications for a vehicle client: (1) an ECU (engine control unit) based on an ARM CPU (central processing unit) with no OS and limited capabilities, (2) a gateway device, also based on an ARM CPU, running Linux, and (3) an automotive head unit based on an Intel Celeron running Windows 10.

In this example, the software development organization is developing a software application the user interacts with via the head unit, but requires related software on the other two devices communicating with the software on the head unit. Some of the same software modules are present in the applications for all three targets and some are different; either because of the use case or because of hardware/OS differences. The organization may build the software applications for all three targets at the same time, involving parallel software verification and parallel roll out to customers.

The problem is the software application for each target uses different toolchains, has different dependencies, and yet includes some shared source code. In some cases the exact same source code may have platform-specific build rules and steps on different targets. In other cases the source code is specific to the target. This may be difficult to manage in a repeatable way that is amenable to code audits, verification, and software forensics.

Also increasing the difficulty level is the possibility that toolchains change over time. Unless the same version of a toolchain is available to the organization, the organization cannot reliably re-create a software application build. There is also a related phenomenon called 'bitrot', where source code which used to work with one version of a toolchain or an OS no longer works with a later version. With bitrot, sometimes the source code might even compile correctly, but then produce a different result at runtime.

The most significant issue created by all of the problems described above is an inability to determine exactly what all the various inputs of a software application build were after, and even before, the build. As a result there is no such thing as a repeatable build that is infallible and guaranteed useful for code verification and software forensics. Additionally there is no way to perform a reliable code audit because the source code used for a build might differ from the source code provided to the auditors.

What is required to solve all of these issues is an SSOT for each software application build (https://en.wikipedia.org/wiki/Single_source_of_truth). Having an SS OT allows exact recreation of all the source code, the dependencies, the toolchains, the build rules, and so on.

Of course, creating a SSOT of everything required for any but the most trivial software applications is difficult. And, even with a SSOT, the tools are not guaranteed to produce exactly the same binary outputs every time. Leaving every other consideration behind, it is possible that a compiler will embed dates and other information in the object code; differing one build from another; even with the same source code, toolchain, and build rules.

There are currently no standard automated tooling for creating an SSOT of a software application build, although it is possible to do so manually—with the related possibility of human error. There are tools, such as version control software, that provide creation of immutable versions of the source inputs. These tools can be used to create backups of the build systems and their installed toolchains. Build logs and other output from the build process may be stored, also. Some organizations have other internal tooling to help with this process to a greater or lesser extent, but it isn't common and, in practice, is complicated by the use of package managers as described above.

There are reasons for this: a comprehensive solution for creating an SSOT of any software application build based on existing procedures would be complex and difficult to manage. It would require changing software development practices. Software developers would find it cumbersome and grueling to use.

FIG. 1A schematically illustrates a build system 100 supporting code audits, code verification, and software forensics, according to various embodiments. The build system 100 may include one or more repositories 105, hereinafter a "repository" (e.g., a trusted software repository, in which data from multiple systems is aggregated to an SSOT or other data store). The repository 105 may include source code and other assets. The build system 100 may include an Application (the controller 120) and the Master Build Script (MBS) 135 that it executes once a software blueprint 121 (e.g., a description of the associations of components and datatype resources, which may contain build steps that are used in the build process) is sent to it. The software blueprint may be pre-validated for correctness before it is sent to the MBS 135. The MBS 135 may ingest the software blueprint 121 and create modeling information (e.g., a relationship graph 136) to model the module dependencies, data flow, and project hierarchy relationships. The MBS 135 then creates the projects, fetches the sources, and runs the named steps based on the modeling information 136.

The build system 100 may include one or more build servers 125 (hereinafter "build server") to assemble builds (e.g., build outputs) using the content of the repository 105. The build server 125 may be under control of one or more controllers 120 (hereinafter "controller"), in various embodiments. The build server 125 and controller 120 may utilize one or more physical processors to execute instructions stored on a memory, that when executed by the one or more physical processors, perform any of the build server or controller operations described herein. These processors may be distributed across one or more computing systems in various examples (for example, the controller may correspond to a physical processor of a workstation controlled by a person and the build server may correspond to one or more physical processors of one or more server computers).

Figure 3A:
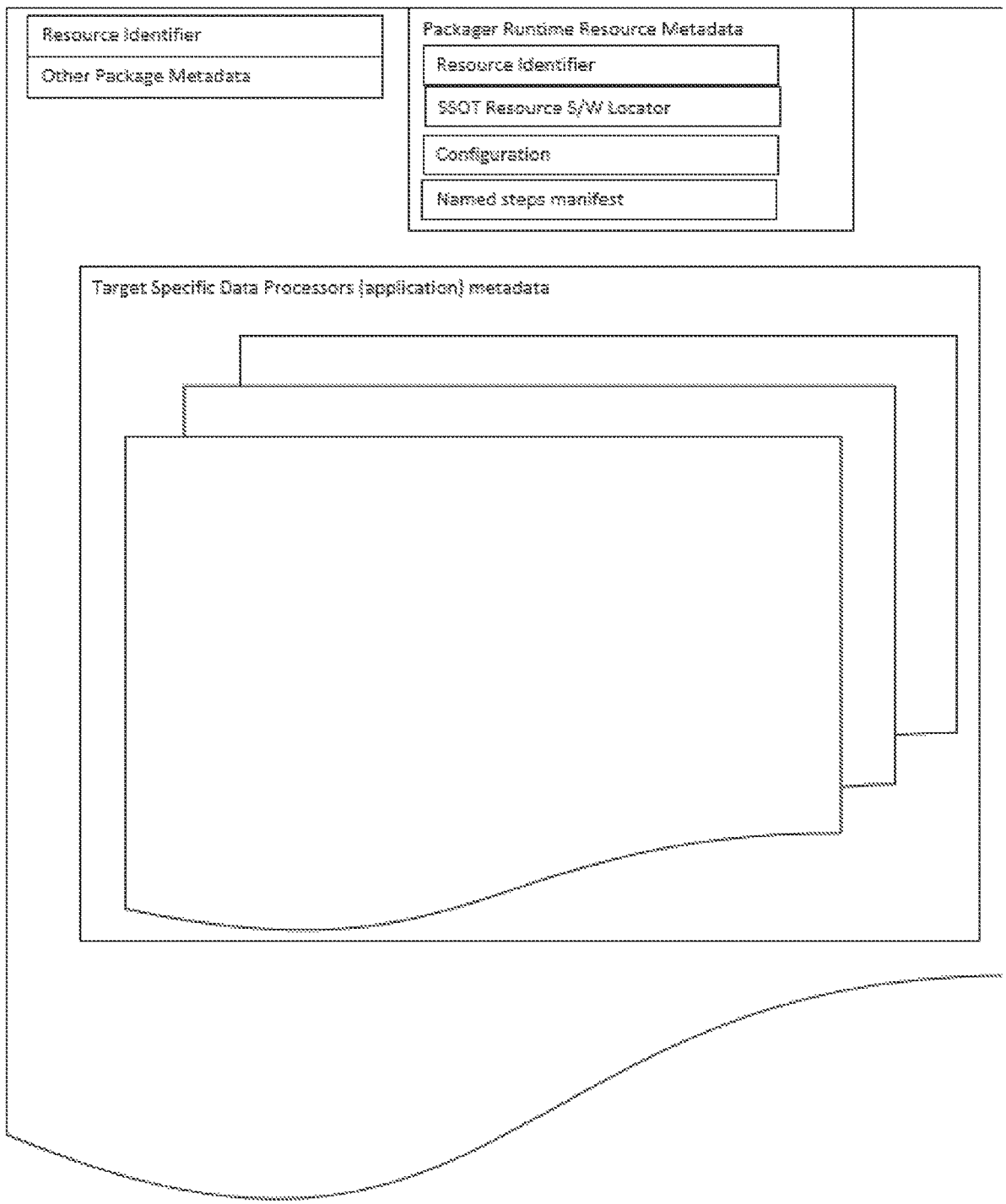
FIG. 3A schematically illustrates a package of the software blueprint used by the build system of FIG. 1A.

The controller 120 may initiate a build by sending a software blueprint package 121 (FIG. 3A). The software blueprint package may encapsulate sets of configuration and build steps for one or more runtime applications (which may span heterogeneous sets of devices (FIG. 3B, e.g., data processor to build server 125. Runtimes may be used to configure the runtime environment, which has a tuple of attributes including application type, such as process, container, object file, OS, architecture family, or specific device. A runtime can support one or more devices (and one or more runtimes can support the same device).

The software blueprint 121 may contain references to resource nodes that have dependencies on other resource nodes. These references may contain links to the software repository 105, and a structure that describes names for each resource node. The software blueprint may contain named steps, rather than build rules and build dependencies. Build rules and build dependencies may be described in files, such as CMake files, Make files, or bitbake recipes, which may be part of the SSOT sources that are downloaded.

The software blueprint 121 may be generated from a default software blueprint by some other system (not shown), in which steps of the default software blueprint may be overwritten, disabled, deleted, added to, refined, or forced to return to a true or false status. This may be done after a default software blueprint is created.

The build server 125 may start a master build script (MBS) 121. The MBS 121 may validate the software blueprint and model the system with a relationship graph 136 to decompose the package into one or more of data processor source projects (e.g., runtime application source projects) containing sub-projects to host other software entities described in the software blueprint. The build server 125 may fetch source code and other assets 106 specified in the software blueprint from the repository 105 to populate the project hierarchy. The MBS 121 may execute the build steps and the rules specified in the software blueprint and modeled by a dependency graph in an order defined by the modeling information to create runtime applications for each data processor (e.g., runtime application).

Build artifacts and logs 111 from the build may be sent to any storage location 110. These build artifacts may include executable binary files, object code and libraries, OCI containers, tarballs, archives, RPM (Red Hat package manager or RPM package manager) files, DEB (Debian Linux distribution) files, IPKG (Itsy package management system) packages and or build logs. The logs of the build artifacts and logs 111 may be generated by the MBS 121.

The build server 125 may also send build notifications 126 to the controller 120. If any fatal errors or failures occur the build may be halted and an appropriate build notification may be sent to the controller 120. In various embodiments, the application, the modeling information created from it, the versioned software code in the software repository, and the build system and toolchains used all together represent an SSOT for auditing and software forensic purposes. With an SSOT everything, from the application to the software modules it specifies to the device-specific build rules and steps, and even the toolchains and the build system itself are versioned and these versions are immutable and retrievable in the future—making it possible to exactly replicate any build for an application using the same source code, the same build rules and steps, the same dependencies, and even the same build system and build tools. It is possible to apply any software code audit or forensic tools at any time after deployment to applications already 'in the field' (unlike some partial solutions that may be restricted to tools designed for object code or that may require ad hoc aggregation of the source code and build rules and steps from a number of different (and, perhaps, dissenting) 'sources of truth.' In various embodiments, the build system 100 may include:

One or more trusted software repositories supporting immutable versions where specific versions of software code and other assets may be specified and retrieved;

Additional information provided for software modules, indicating any device-specific or component-specific build rules and steps or dependencies that apply to them;

Additional information provided for device targets, indicating any device-specific or component-specific build rules and steps or dependencies that apply to them;

A software blueprint for an application that specifies the target device(s), all software code required to perform the build, resource dependencies, and component-specific build steps;

An MBS to convert the software blueprint into modeling information representing a relationship graph; and/or A build system that utilizes the software blueprint and the trusted software repositories to perform the builds with the correct software source code, dependencies, and build rules and steps.

The MBS may not perform build rules—rather the detailed logic and processing for performing build rules (which in turn process software dependencies) may reside with the SSOT code/toolchain that the node's location/version tuple identifies). Names steps described in the software blueprint may be propagated to the nodes of a relationship graph. These steps may be extracted from component metadata during creation of the software blueprint. At this point they can be left alone, enabled, disabled, set to always pass, set to always fail, be modified or be deleted. New steps may be added to the software blueprint.

These steps may be the basis of control for building packages of applications with packagers, runtimes, modules and datatypes whose sources may be collocated within the same repository or may be aggregated across multiple repositories. The execution order of the named steps may be preserved within the model and may not be affected by any execution logic that may reside within the SSOT code/toolchain.

The named steps may be executed in a sub-process on the build server and may be passed a context. These steps may describe any command, script, program, or the like, that is available to be processed within the SSOT. A command may be as simple as 'make' or 'build_module.sh' or could be complex command line.

The build system 100 may include a component called a 'runtime' that may abstract the environment where data processors can run. For example, a runtime may describe a system that runs a sandbox process on a host, or a sandbox process that runs within a container running on a host OS (both of these may use a toolchain and run for a wide variety of devices. Another runtime may describe a system that runs an OS and a specific hardware processor on a specific board with a specific version of booting software. Yet another runtime may run a specific OS on any device based on a particular platform. These runtimes may exist in virtual machines or distributed across multiple physical devices.

A metadata file may specify a unique ID for the resource, software source code and toolchain dependencies, default build rules and steps for the device or custom build rules and steps (if required) for the source code, and the locations to fetch resources from at runtime. As with other software components, the metadata may contain the named steps. Resource node types with metadata include, but are not limited to:

A Packager that encapsulates one or more runtime resources that orchestrate the building and packaging of applications that may run on a set of heterogeneous devices;

Runtimes providing the software platform environment, toolchains, and other assets required to build the application containing software modules and datatypes. Runtimes may have a tuple of attributes including application types, and as process, container, object file, OS, architecture family, or specific device. A runtime can support one or more devices (and one or more runtimes can support the same device);

Software modules providing the software application functionality; and/or

Data types representing data that is input or output to software modules (may not be required in some implementations).

Figure 1B:
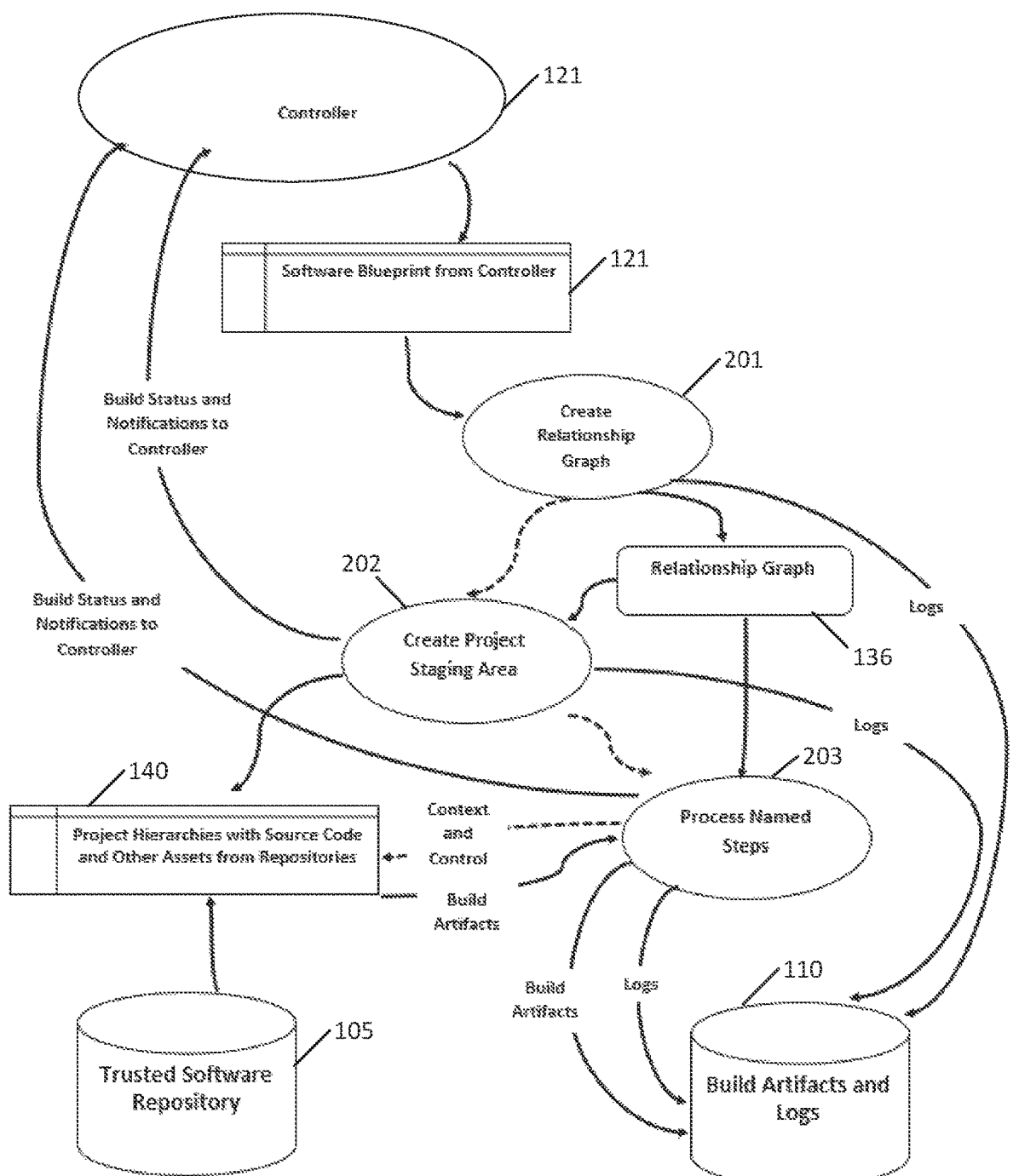
FIG. 1B is a data/control flow diagram illustrating a process performed by the MBS of FIG. 1A.

FIG. 1B is a data/control flow diagram illustrating a process 200 performed by the MBS 121 of FIG. 1A. The build system 100 (FIG. 1A) may host a software blueprint parser and resource model generator 301 (FIG. 2) that identifies the software blueprint and executes the MBS 121 to process the software blueprint 121. The MBS 121 may create 201 a model (e.g., a relationship graph 136, which is shown in FIG. 2 in more detail) of the resource nodes in the software blueprint 121.

Figure 2:
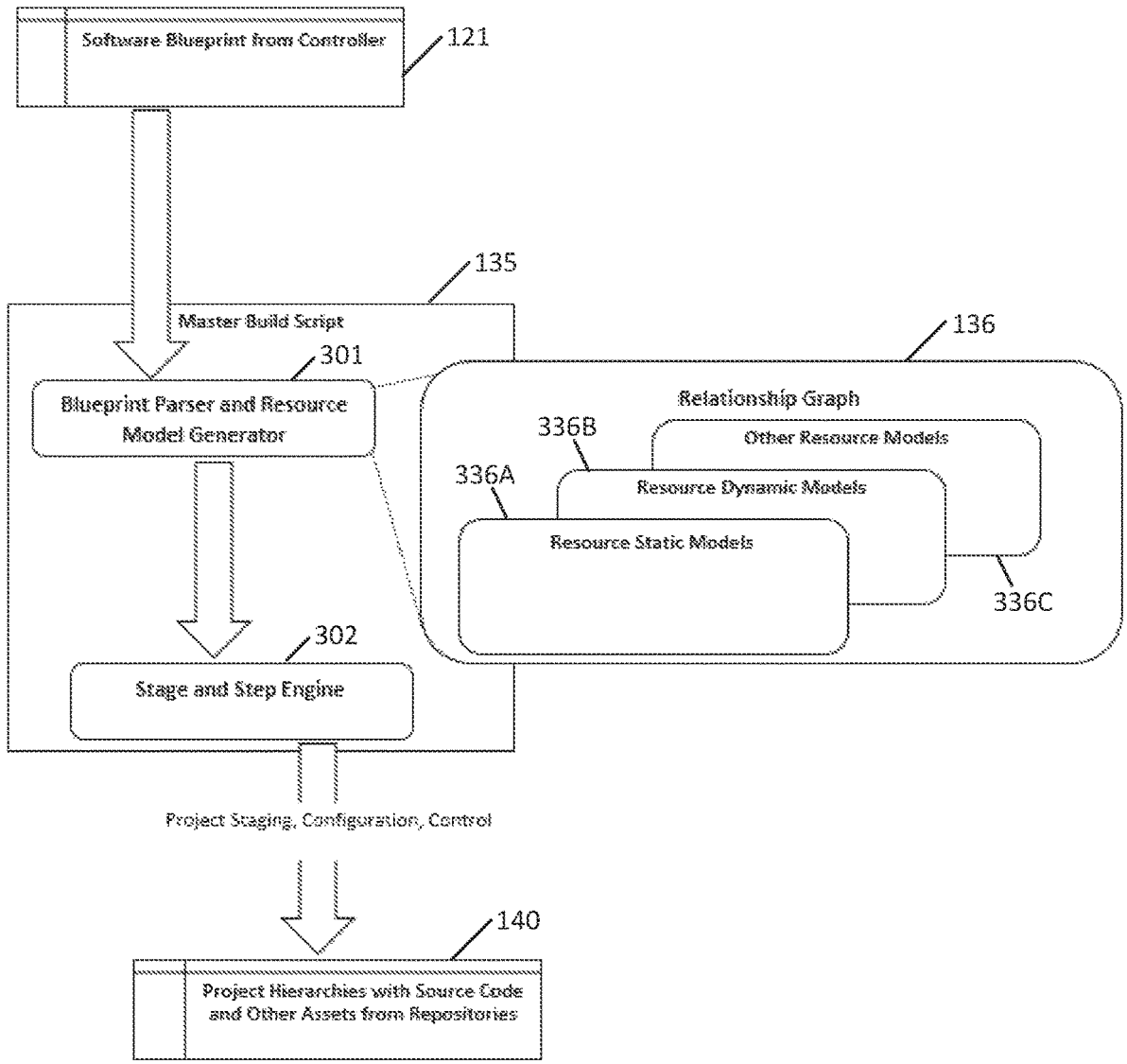
FIG. 2 is a detailed view of the MBS of FIG. 1A and the generated modeling information.

Referring to FIG. 2, the modeling information (e.g., the relationship graph 136 may contain resource static models, 336A, resource dynamic models 336B, and/or other resource models 336C. In various embodiments, the modeling information 136 may be intermediate data stored in RAM or other volatile memory. This modeling information may be used to model resource project hierarchies that contain the downloaded source/toolchains to and model the relationships of runtime resource objects so that the named steps are executed in a predefined order (e.g., a hierarchically controlled order and/or a topographically sorted order) and so that the resulting data processors are configured correctly, as a system. In various embodiments, the software blueprint and output generated using the modeling information may be stored in persistent storage.

Referring again to FIG. 1B, the build system 100 may host a stage and step engine 302 (FIG. 2) that may create 202 a project staging area containing a project hierarchy 140 using modeling information (e.g., the relationship graph 136) and fetch all required resources, including software source code and architecture-specific or device-specific toolchains (e.g., runtime specific toolchains) from the referenced immutable versions in a software repository to the project hierarchy on the build system 100—creating the SSOT for that application and device (e.g. on a runtime which may support a specific application type on a specific OS on a specific family of hardware devices or specific device). Finally, the MBS 121 may execute 203 the steps for each resource node in a hierarchically controlled order of package, application, and contained resources or a topographically sorted order of dataflow of data types between modules. Every step of this process may be logged for later reference, if required, and the logs are automatically backed up.

Figure 4:
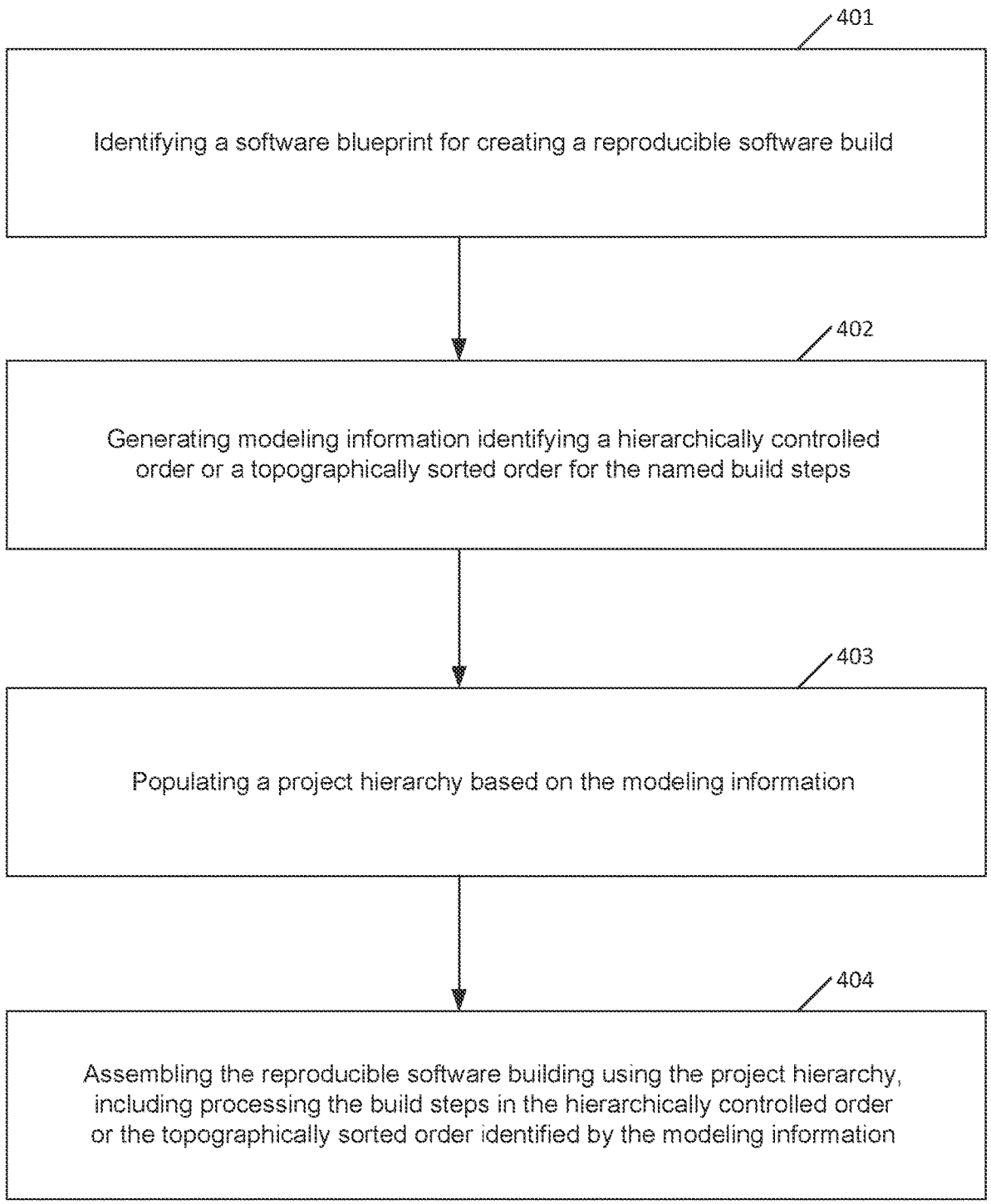
FIG. 4 illustrates a process that may be performed by the build system of FIG. 1, according to various embodiments.

FIG. 4 illustrates a process 400 that may be performed by the build system of FIG. 1, according to various embodiments.

In block 401, the build system may identify a software blueprint for creating a reproducible software build. The software blueprint may be similar to any software blueprint described herein, and may include resource nodes containing a manifest of named build steps and 1) a resource identifier, or 2) an SSOT resource software locator.

In various embodiments, software blueprint packages may encapsulate one or more target specific applications. Applications may have a runtime resource and set of module and data type resources that makeup the applications. Where applicable these resources may be defined in system resource collections that define the relationship and structure of the build and runtime components.

In block 402, the build system may generate modeling information identifying a hierarchically controlled order or a topographically sorted order for the named build steps. The modeling information may be similar to any modeling information described herein. In some embodiments, the modeling information may be in the form of a relationship graph, but this is not required. In various embodiments, the modeling information may be in any form now known or later developed.

The relationship graph may contain resource nodes—all types of resource nodes (including packagers, runtimes, modules, and datatypes) may have metadata that:

May contain an SSOT Resource S/W locator that contains the location and version of the SSOT repository for the resource in question. In various embodiments, this location information may be used by an MBS to determine the SSOT sources to download;

Optionally may contain component runtime or build time configuration parameters;

Optionally may contain compatibility information;

May contain references to other components/data types;

May contain other metadata; and/or

May contain system resource collections that define the relationships and structure of the build and runtime components.

In block 403, the build system may fetch the SSOT resources, and may populate a project hierarchy based on the modeling information. The project hierarchy may be an SSOT for the reproducible software build.

In block 404, the build system may assembling the reproducible software from contents of the SSOT. This may include processing the build steps in the hierarchically controlled order or topographically sorted order identified by the modeling information.

Figure 3B:
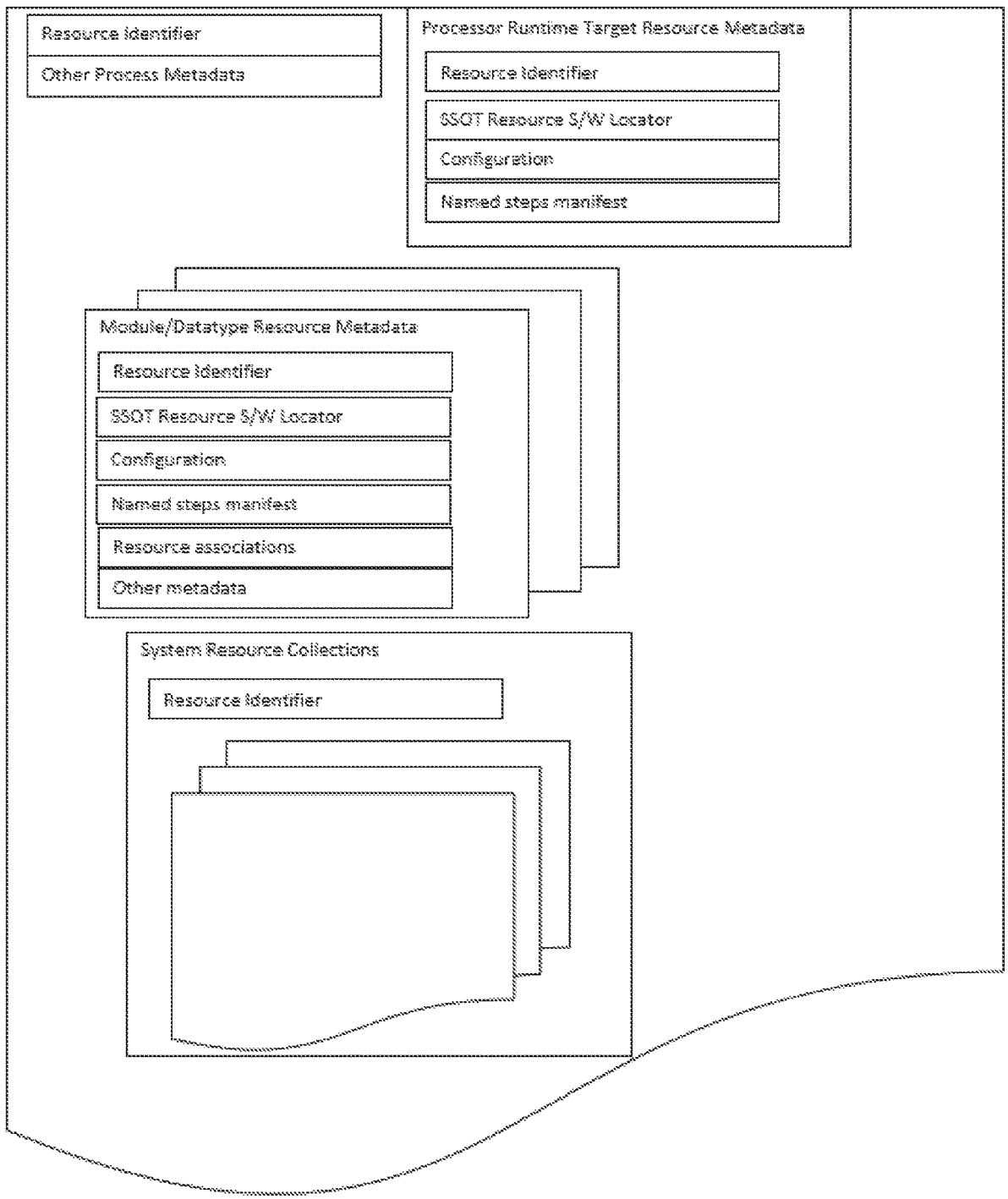
FIG. 3B schematically illustrates a data processor (e.g., a runtime application) of the software blueprint used by the build system of FIG. 1A.

In various embodiments may include additional selected software development support; including, but not limited to:

An SDK (software development kit) supporting the creation and testing of highly portable software modules where any dependencies are associated directly with the modules instead of using a dependency/configuration management system;

Modularity supports auditability and verification by restricting the 'reach' of code and possible side effects to a single module;

A framework for highly modular design with a clean separation between data types and software components, which may include a data processor (e.g., a runtime application). FIG. 3B illustrates a schematic diagram of such a data processor (e.g., a runtime application);

The example framework includes the ability to target builds towards multiple devices at the same time by providing a software blueprint for those builds into a single 'package,' such as the package schematically illustrated in FIG. 3A—packages are not required, but does make it possible to combine related application builds into a single auditable group; A device-specific runtime, which supports portable software modules wherever possible;

meaning the runtime provides a portable API (application programming interface) for the modules to use on every supported platform. Portable APIs may provide the same interfaces on all platforms, but are implemented in a way specific to the hardware and OS; examples of portable APIs include a Hardware Abstraction Layer ('HAU') or Board Support Package ('BSP'); and/or Portable APIs support auditability and verification by restricting the number of APIs used by the software code.

In various embodiments, any build system described herein may provide fully repeatable and auditable builds based on an SSOT for each software blueprint. The build system 100 may support keeping all software dependencies with the related source code in a trusted software repository (e.g., no need for a dependency or configuration management system). The build system 100 may provide flexible software builds supporting different devices and platforms, including emulators and simulators, without losing the ability to exactly reproduce a build.

Any build system described herein may create an SSOT for any software application build for any device target, and may provide the ability to reconstruct every aspect of that build within the limits of the toolchains used. The build system may be highly flexible and based on layered rules defined: per device (toolchain, build rules and steps, etc.), per software component (build rules and steps, etc.), per application (build rules and steps, etc.), and/or software dependency rules, requirements, and even the toolchains used for a build are kept in a version control system and versioned exactly like the related software components, not fetched from external sources at build time.

Most of the equipment discussed above comprises hardware and associated software. For example, the typical build system is likely to include one or more hardware processors and software executable on those hardware processors to carry out the operations described. The term software herein is used in its commonly understood sense to refer to programs or routines (subroutines, objects, plug-ins, etc.), as well as data, usable by a machine or hardware processor. As is well known, computer programs generally comprise instructions that are stored in machine-readable or computer-readable storage media. Some embodiments of the present invention may include executable programs or instructions that are stored in machine-readable or computer-readable storage media, such as a digital memory. This description should not be interpreted to imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory contained within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. It is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A build system, comprising:
a memory storing instructions that, when executed by one or more hardware processors, cause the one or more hardware processors to perform operations including:
identifying a software blueprint for creating a reproducible software build on a specific device from a set of devices, the software blueprint comprising:
resource nodes that include a manifest of named build steps; and
a resource identifier or a single source of truth (SSOT) resource software locator;
generating modeling information identifying a hierarchically controlled order or a topologically sorted order for the named build steps;
populating, based on the modeling information, an SSOT for the reproducible software build, the populated SSOT comprising device-specific build steps for the specific device; and
assembling, using the populated SSOT, the reproducible software build for the specific device by processing the device-specific build steps.

2. The build system of claim 1, further comprising a controller and one or more build servers.

3. The build system of claim 1, further comprising one or more master build scripts (MBS(s)) to execute a software blueprint package comprising the software blueprint.

4. The build system of claim 3, further comprising a controller to initiate the reproducible software build by sending the software blueprint package to the one or more MBS(s).

5. The build system of claim 1, wherein the software blueprint resides in a software blueprint package comprising package resource metadata, runtime resource metadata, and application metadata, the software blueprint package encapsulating target-specific module resources and data type resources that make up an application.

6. The build system of claim 5, wherein the runtime resource metadata comprises the manifest.

7. The build system of claim 5, wherein the application metadata comprises one or more target-specific applications.

8. The build system of claim 7, wherein the software blueprint package includes application resource metadata, application runtime target resource metadata, and module/datatype resource metadata corresponding to at least one of the one or more target-specific applications.

9. The build system of claim 5, wherein the application comprises a plurality of target specific applications spanning a heterogeneous set of devices.

10. The build system of claim 1, wherein the operations further comprise configuring a runtime environment based on attributes comprising at least one of:
   application type;
   operating system (OS);
   architecture family; or
   the specific device.

11. A method of creating a reproducible software build using one or more build servers, the method comprising:
   identifying a device-specific software blueprint for creating the reproducible software build on a specific device from a set of devices, the software blueprint comprising:
      resource nodes that include a manifest of named build steps; and
      a resource identifier or a single source of truth (SSOT) resource software locator;
   generating modeling information identifying a hierarchically controlled order or a topologically sorted order for the named build steps;
   populating, based on the modeling information, an SSOT for the reproducible software build, the populated SSOT comprising device-specific build steps for the specific device; and
   assembling, using the populated SSOT, the reproducible software build for the specific device by processing the device-specific build steps.

12. The method of claim 11, wherein the populated further comprises all source code, dependencies, and toolchains for the reproducible software build.

13. The method of claim 11, wherein the one or more build servers ingest the software blueprint.

14. The method of claim 13, wherein the one or more build servers output build status and notifications comprising executable binary files, object code and libraries, OCI (open container initiative) containers, tarballs, archives, package management system files, or build logs.

15. The method of claim 13, wherein the populated SSOT is further based on source code and other assets from one or more software repositories.

* * * * *